US006636567B1

(12) United States Patent
Roberts et al.

(10) Patent No.: US 6,636,567 B1
(45) Date of Patent: Oct. 21, 2003

(54) METHOD OF SPECIFYING NON-ALLOWABLE PULSE CHARACTERISTICS

(75) Inventors: Mark D. Roberts, Huntsville, AL (US); Marcus H. Pendergrass, Huntsville, AL (US); Larry W. Fullerton, Brownsboro, AL (US); James L. Richards, Fayetteville, TN (US)

(73) Assignee: Time Domain Corporation, Huntsville, AL (US)

( * ) Notice: Subject to any disclaimer, the term of this patent is extended or adjusted under 35 U.S.C. 154(b) by 656 days.

(21) Appl. No.: 09/592,289

(22) Filed: Jun. 12, 2000

(51) Int. Cl.[7] .............................................. H04B 14/06
(52) U.S. Cl. ...................... 375/247; 375/239; 375/242
(58) Field of Search ................................ 375/138, 238, 375/239, 242, 247

(56) References Cited

U.S. PATENT DOCUMENTS

| 5,677,927 A | * | 10/1997 | Fullerton et al. | ............ | 375/130 |
| 5,687,169 A | * | 11/1997 | Fullerton | ..................... | 370/324 |
| 6,212,230 B1 | * | 4/2001 | Rybicki et al. | ............. | 375/239 |
| 6,492,904 B2 | * | 12/2002 | Richards | ..................... | 340/539 |

OTHER PUBLICATIONS

Comments of Pulson Communications Corporation in the Matter of Amendment of the Commission's Rules to Establish New Personal Communications Services as filed at the Federal Communications Commission on Nov. 9, 1992; GEN. Docket No. 90–314, ET Docket No. 92–100.

* cited by examiner

*Primary Examiner*—Phoung Phu
(74) *Attorney, Agent, or Firm*—Venable LLP; Robert S. Babayi

(57) ABSTRACT

A code specifies characteristics of pulses transmitted and received by an impulse transmission system. The invention provides methods for defining non-allowable regions within pulse characteristic value range layouts enabling non-allowable regions to be considered when generating a code. Various approaches are used to define non-allowable regions based either on the pulse characteristic value range layout or on characteristic values of one or more other pulses. Various permutations accommodate differences between temporal and non-temporal pulse characteristics. Approaches address characteristic value layouts specifying fixed values and characteristic value layouts specifying non-fixed values.

When generating codes to describe pulses, defined non-allowable regions within pulse characteristic value layouts are considered so that code element values do not map to non-allowable pulse characteristic values.

40 Claims, 9 Drawing Sheets

FIGURE 1. Characteristic Value Range Layout Parameters

Non-Allowable Regions Within Temporal Value Range Layout Viewed Separately
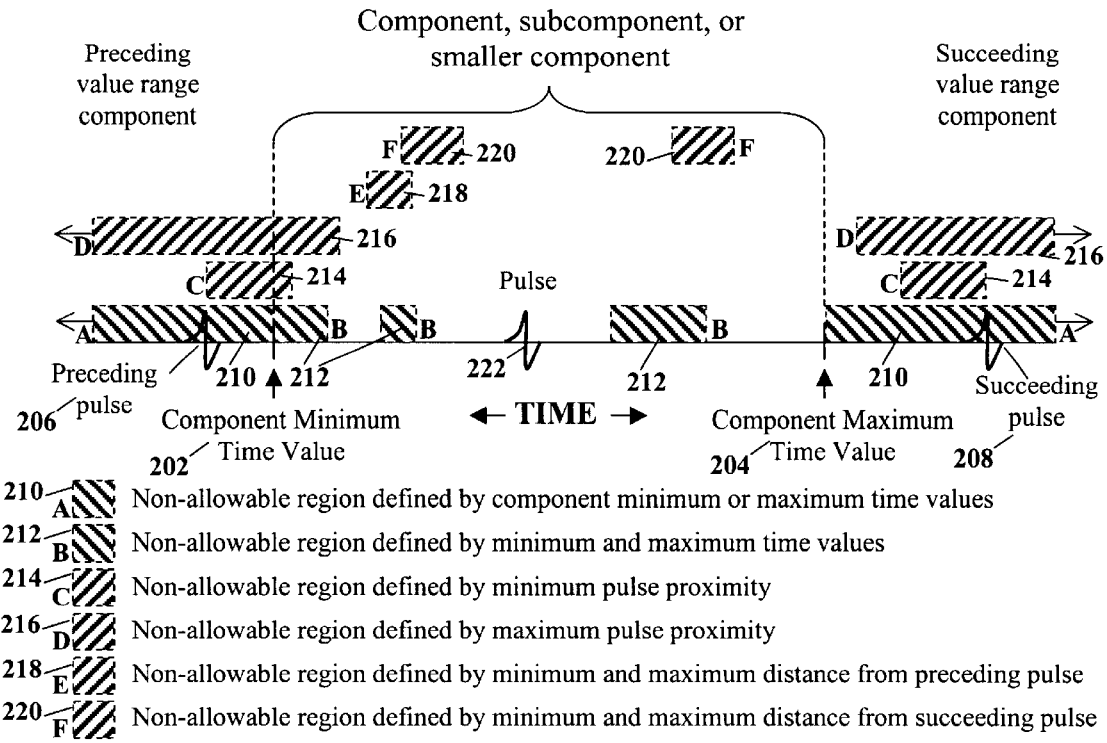
Non-Allowable Regions Within Temporal Value Range Layout Viewed Combined
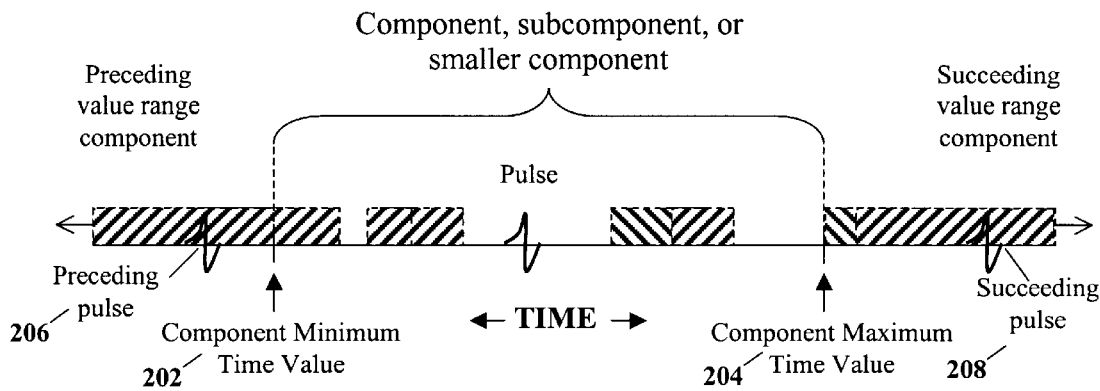
FIGURE 2.

Non-Allowable Regions Within Non-temporal Value Range Layout Viewed Separately

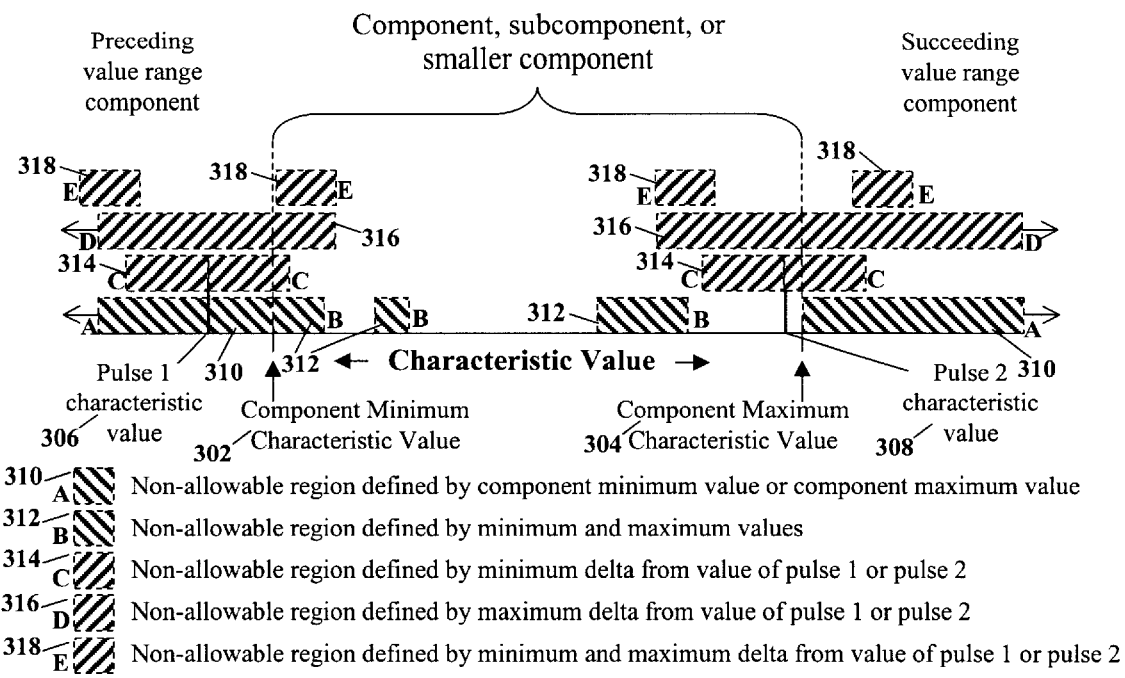

- 310 A: Non-allowable region defined by component minimum value or component maximum value
- 312 B: Non-allowable region defined by minimum and maximum values
- 314 C: Non-allowable region defined by minimum delta from value of pulse 1 or pulse 2
- 316 D: Non-allowable region defined by maximum delta from value of pulse 1 or pulse 2
- 318 E: Non-allowable region defined by minimum and maximum delta from value of pulse 1 or pulse 2

Non-Allowable Regions Within Non-temporal Value Range Layout Viewed Combined

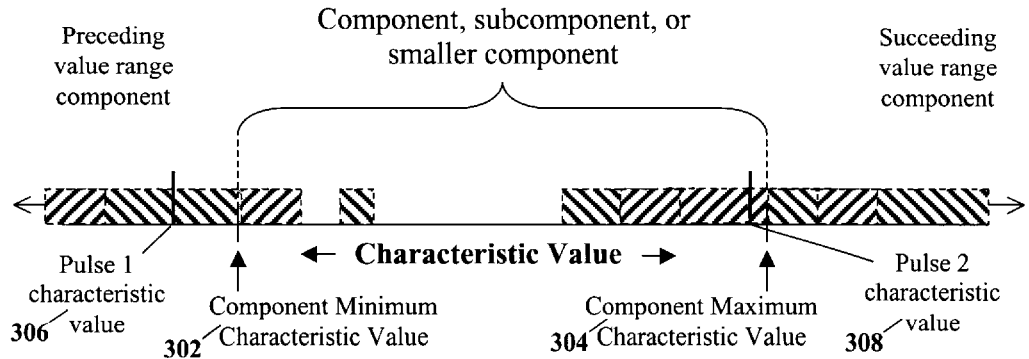

FIGURE 3. Non-allowable Regions

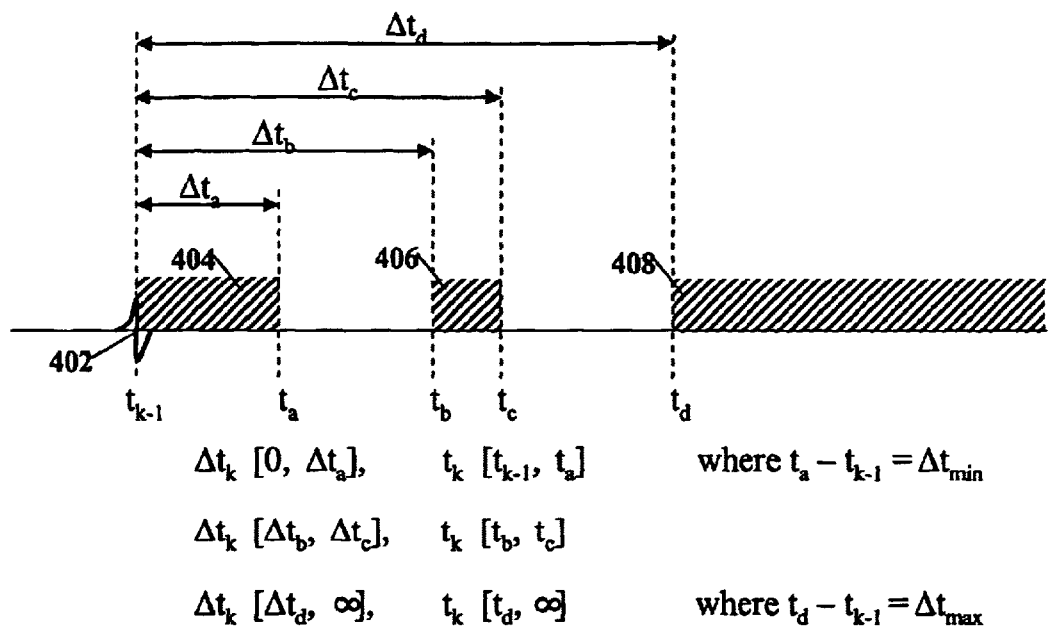
FIGURE 4a. Non-allowable Regions Relative to Preceding Pulse Position
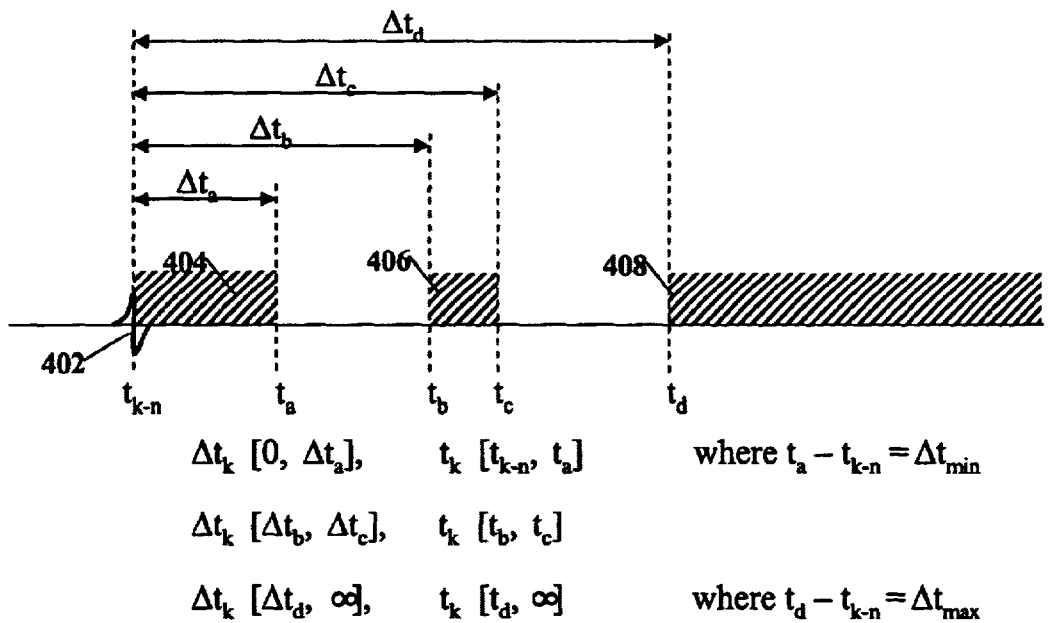
FIGURE 4b. Non-allowable Regions Relative to Any Preceding Pulse Position

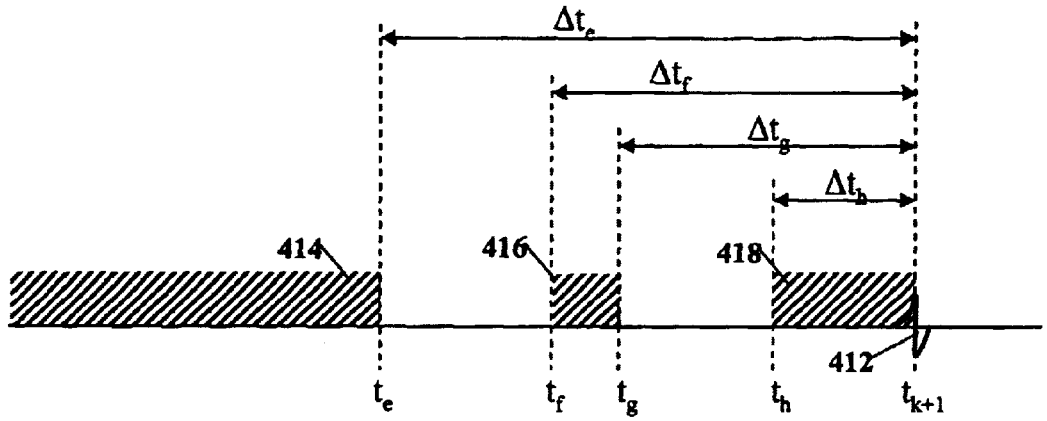
FIGURE 4c. Non-allowable Regions Relative to Succeeding Pulse Position
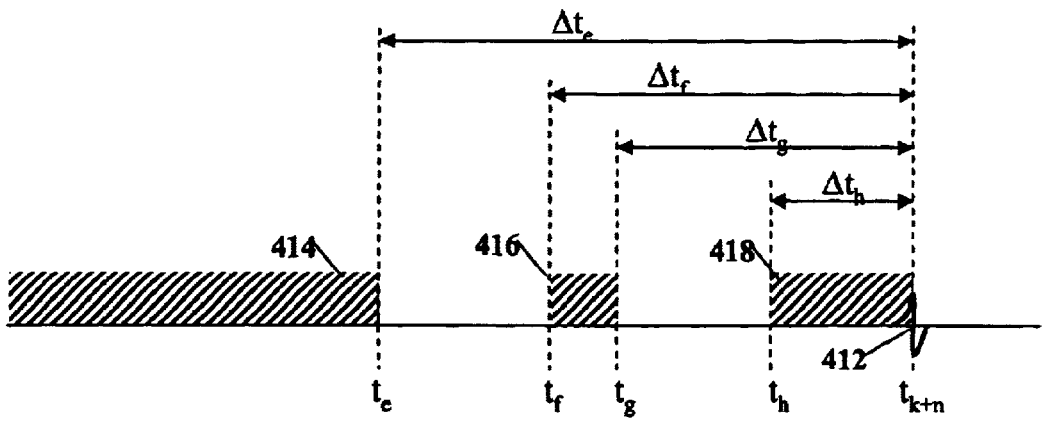
FIGURE 4d. Non-allowable Regions Relative to Any Succeeding Pulse Position

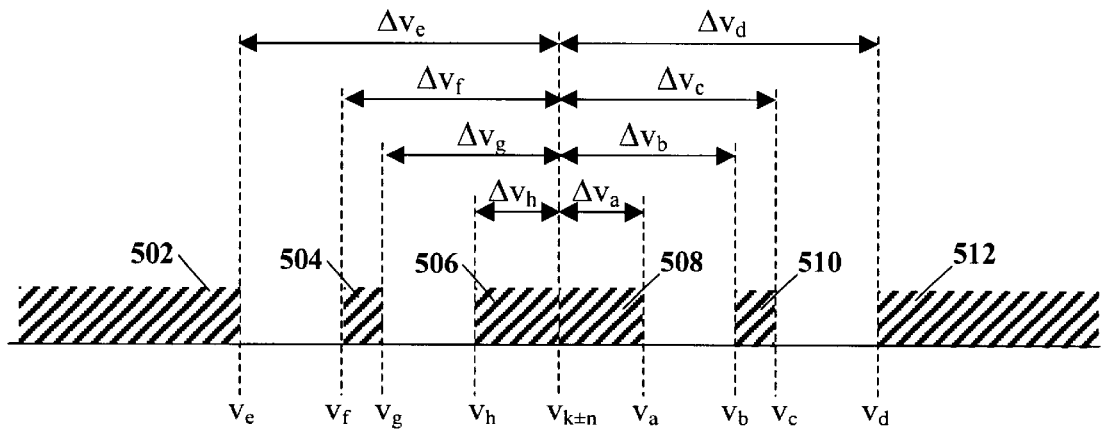

| | | |
|---|---|---|
| $\Delta v_k \notin [-\infty, -\Delta v_e]$, | $v_k \notin [-\infty, v_e]$ | where $v_{k\pm n} - v_e = \Delta v_{max}$ |
| $\Delta v_k \notin [-\Delta v_f, -\Delta v_g]$, | $v_k \notin [v_f, v_g]$ | |
| $\Delta v_k \notin [-\Delta v_h, 0]$, | $v_k \notin [v_h, v_{k\pm n}]$ | where $v_{k\pm n} - v_h = \Delta v_{min}$ |
| $\Delta v_k \notin [0, \Delta v_a]$, | $v_k \notin [v_{k\pm n}, v_a]$ | where $v_a - v_{k\pm n} = \Delta v_{min}$ |
| $\Delta v_k \notin [\Delta v_b, \Delta v_c]$, | $v_k \notin [v_b, v_c]$ | |
| $\Delta v_k \notin [\Delta v_d, \infty]$, | $v_k \notin [v_d, \infty]$ | where $v_d - v_{k\pm n} = \Delta v_{max}$ |

FIGURE 5. Non-allowable Regions Relative to Characteristic Value of Any Other Pulse

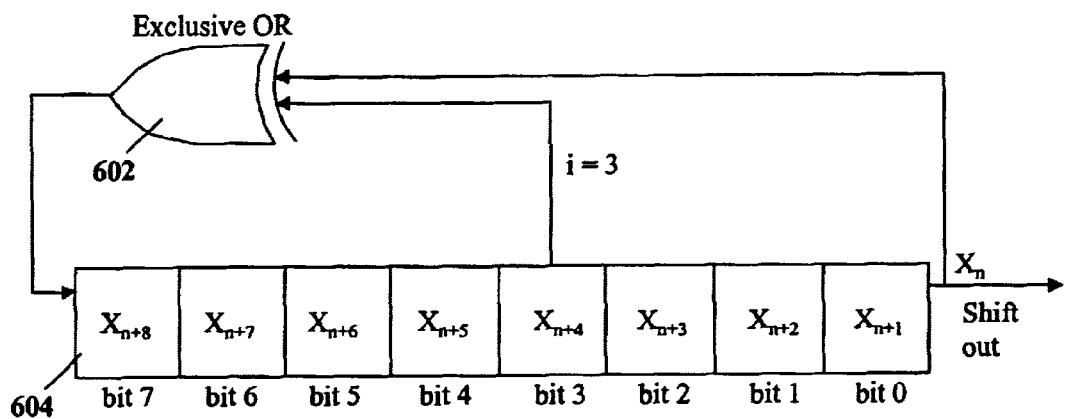
FIGURE 6. Linear Feedback Shift Register
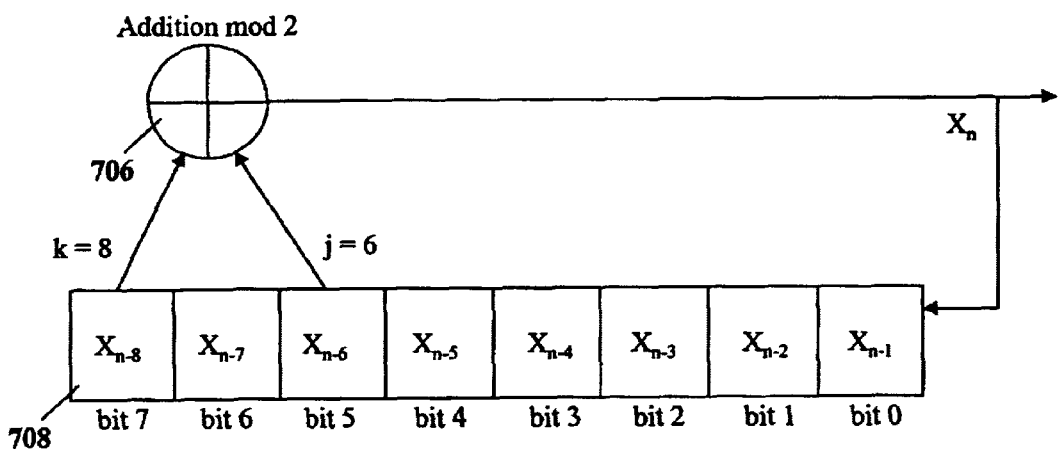
FIGURE 7. Lagged-Fibonacci Shift Register Generator

METHOD OF SPECIFYING NON-ALLOWABLE PULSE CHARACTERISTICS

CROSS-REFERENCE TO OTHER APPLICATIONS

The following applications of common assignee may contain common disclosure with the present application:

U.S. Patent Application Ser. No. 09/638,192 entitled "A METHOD FOR SPECIFYING NON-TEMPORAL PULSE CHARACTERISTICS", filed concurrently herewith, U.S. Patent Application Ser. No. 09/638,046 entitled "A METHOD AND APPARATUS FOR APPLYING CODES HAVING PRE-DEFINED PROPERTIES", filed concurrently herewith, U.S. Patent Application Ser. No. 09/637,878 entitled "A METHOD AND APPARATUS FOR POSITIONING PULSES USING A LAYOUT HAVING NON-ALLOWABLE REGIONS", filed concurrently herewith, U.S. Patent Application Ser. No. 09/638,150 entitled "A METHOD AND APPARATUS FOR POSITIONING PULSES IN TIME", filed concurrently herewith, U.S. Patent Application Ser. No. 09/638,151 entitled "A METHOD AND APPARATUS FOR MAPPING PULSES TO A NON-FIXED LAYOUT", filed concurrently herewith, U.S. Patent Application Ser. No. 09/638,152 entitled "A METHOD AND APPARATUS FOR SPECIFYING PULSE CHARACTERISTICS USING A CODE THAT SATISFIES PREDEFINED CRITERIA", filed concurrently herewith, U.S. Patent Application Ser. No. 09/638,153 entitled "METHOD FOR SPECIFYING PULSE CHARACTERISTICS USING CODES", filed concurrently herewith.

The above-listed applications are incorporated herein by reference in their entireties.

BACKGROUND

1. Field of the Invention

The present invention relates to impulse transmission systems and, more particularly, to a method of specifying non-allowable characteristics of pulses in an impulse transmission system.

2. Related Art

As the availability of communication bandwidth in the increasingly crowded frequency spectrum is becoming a scarce and valuable commodity, Time Modulated Ultra Wideband (TM-UWB) technology provides an excellent alternative for offering significant communication bandwidth, particularly, for various wireless communications applications. Because TM-UWB communication systems are based on communicating extremely short-duration pulses (e.g., pico-seconds in duration), such systems are also known as impulse radio systems. Impulse radio systems were first described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,057 (issued Nov. 8, 1994) to Larry W. Fullerton, and U.S. Pat. No. 5,677,927 (issued Oct. 14, 1997), U.S. Pat. No. 5,687,169 (issued Nov. 11, 1997), and U.S. Pat. No. 5,832,035 (issued Nov. 3, 1998) to Larry W. Fullerton, et al. These patents are incorporated herein by reference.

Multiple access impulse radio systems are radically different from conventional Code Division Multiple Access (CDMA), Time Division Multiple Access (TDMA) and Frequency Division Multiple Access (FDMA) systems. Unlike such systems, which use continuous sinusoidal waveforms for transmitting information, a conventional impulse radio transmitter emits a low power electromagnetic train of short pulses, which are shaped to approach a Gaussian monocycle. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems. Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, typical impulse radio transmitters use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

In applications where the modulating information signal is a binary information signal, each binary state may modulate the time position of more than one pulse to generate a modulated, coded timing signal that comprises a train of identically shaped pulses that represent a single data bit. The impulse transmitter applies the generated pulses to a specified transmission medium, via a coupler, such as an antenna, which electromagnetically radiates the pulses for reception by an impulse radio receiver. The impulse radio receiver typically includes a single direct conversion stage. Using a correlator, the conversion stage coherently converts the received pulses to a baseband signal, based on a priori knowledge of the time-hopping code. Because of the correlation properties of the selected time-hopping codes, the correlator integrates the desired received pulses coherently, while the undesired noise signals are integrated non-coherently such that by comparing the coherent and non-coherent integration results, the impulse receiver can recover the communicated information.

Conventional spread-spectrum code division multiple access (SS-CDMA) techniques accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat. No. 4,901,307 entitled SPREAD-SPECTRUM MULTIPLE ACCESS COMMUNICATION SYSTEM USING SATELLITE OR TERRESTRIAL REPEATERS by Gilhousen et al.

Unlike direct sequence spread-spectrum systems, the time-hopping code for impulse radio communications is not necessary for energy spreading, because the monocycle pulses themselves have an inherently wide bandwidth. Instead, the impulse radio systems use the time-hoping codes for channelization, energy smoothing in the frequency domain, and interference suppression. The time-hoping code defines a relative position of each pulse within a group of pulses, or pulse train, such that the combination of pulse positions defines the communications channel. In order to convey information on such communication channel, each state of a multi-state information signal varies a relative pulse position by a predefined time shift such that a modulated, coded timing signal is generated comprising a train of pulses, each with timing corresponding to the combination of the time position coding and the multi-state modulation.

In one conventional binary approach, pulses are time-modulated forward or backward about a nominal position. More specifically, each pulse is time modulated by adjusting its position within a time frame to one of two or more possible times. For example, in order to send a "0" binary bit during the time frame, the pulse may be offset from a nominal position of the time frame by about −50 pico-seconds. For a "1" binary state, the pulse may be offset from the nominal position by about +50 pico-seconds. Conventional coders that generate the time-hoping code do so in response to a periodic timing signal that corresponds to the data-rate of the multi-state information signal. The data rate of the impulse radio transmission may for example be a fraction of a periodic timing signal that is used as a time base or time reference.

In practice, decoding errors are minimized using distinctive time-hopping codes with suitable autocorrelation and cross-correlation properties. The cross-correlation between any two time-hopping codes-should be low for minimal interference between multiple users in a communications system or between multiple target reflections in radar and positioning applications. At the same time, the autocorrelation property of a time-hoping code should be steeply peaked, with small side-lobes. Maximally peaked time-hopping code autocorrelation yields optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any sub-frame or frame shift.

McCorkle in U.S. Pat. No. 5,847,677 discloses a random number generator for generating a pseudo-random code for use with jittered pulse repetition interval radar systems. The code is generated by a random number generator that possesses certain attributes desirable for a jittered radar. As disclosed, the attributes related to a flat frequency spectrum, a nearly perfect spike for an autocorrelation function, a controllable absolute minimum and maximum interval, long sequences that do not repeat, and a reasonable average pulse rate.

One known coding technique for an impulse radio is disclosed by Barrett in U.S. Pat. No. 5,610,907, entitled "Ultrafast Time Hopping CDMA-RF Communications: Code-As-Carrier, Multichannel Operation, High data Rate Operation and Data Rate on Demand." According to the disclosed techniques, two levels of coding are used: major orthogonal codes are applied to provide multiple channels, and forward error correction (FEC) codes are applied to information data before transmission. The disclosed system relies on dividing time into repetitive super-frames, frames and sub-frames. As disclosed, a super-frame corresponds to a time interval of about 1 millisecond, representing one repetition of a code pattern, where as a frame is defined as a time interval of about 1 microsecond divided according to a code length. A sub-frame corresponds to a short time interval of about 1 nano second during which a pulse is time positioned.

Because of practical limitations associated with arbitrarily positioning of pulses in adjacent frames, each frame may have to be divided into allowable and non-allowable time regions for positioning a pulse. One such limitation is associated with hardware limitation on minimum pulse-to-pulse time for respective positioning of two pulses on adjacent frames arbitrarily. The system disclosed in Barrett uses a fraction of frame time for encoding and designates the remainder as a RESET period, thereby avoiding placement of pulses in the disclosed type of non-allowable region when mapping a code. Although the disclosed type non-allowable regions have been considered when applying codes, non-allowable regions have not been considered when generating codes. Therefore, there exists a need for a method of defining non-allowable regions when generating codes for use by an impulse transmission system.

SUMMARY OF THE INVENTION

Briefly, according to the present invention, a code specifies characteristics of pulses transmitted and received by an impulse transmission system. Code element values map to at least one defined pulse characteristic value range layout specifying a range of characteristic values. The invention provides methods for defining non-allowable regions within pulse characteristic value range layouts enabling non-allowable regions to be considered when generating a code.

Various approaches are used to define absolute non-allowable regions based on the pulse characteristic value range layout. Additional approaches are used to define relative non-allowable regions based on characteristic values of one or more other pulses. Various permutations of the approaches are provided to accommodate differences between temporal and non-temporal pulse characteristics. Embodiments of the invention are described for use with a pulse characteristic value layout specifying fixed values and for use with a pulse characteristic value layout specifying non-fixed values.

The non-allowable regions defined by the invention are used when generating codes to avoid code element values that map to non-allowable regions.

BRIEF DESCRIPTION OF DRAWINGS

The present invention will be described with reference to the accompanying figures, wherein:

FIG. 2 illustrates a temporal pulse characteristic value range layout including a pulse and a preceding and succeeding pulse relative to the pulse and having multiple non-allowable regions;

FIG. 3 illustrates a non-temporal pulse characteristic value range layout including characteristic values of two other pulses and having multiple non-allowable regions;

FIG. 4a illustrates non-allowable regions relative to a preceding pulse position within a non-fixed temporal pulse characteristic value range layout;

FIG. 4b illustrates non-allowable regions relative to any preceding pulse position within a non-fixed temporal pulse characteristic value range layout;

FIG. 4c illustrates non-allowable regions relative to a succeeding pulse position within a non-fixed temporal pulse characteristic value range layout;

FIG. 4d illustrates non-allowable regions relative to any succeeding pulse position within a non-fixed temporal pulse characteristic value range layout;

FIG. 5 illustrates non-allowable regions relative to any pulse value in a non-fixed non-temporal pulse characteristic value range layout;

FIG. 6 is a diagram of a binary linear feedback shift-register pseudorandom number generator;

FIG. 7 is a diagram of an additive Lagged-Fibonacci shift register pseudorandom number generator;

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

I. Introduction

The present invention provides a method of using a numerically generated code to specify allowable characteristic values of pulses within a pulse train for use in an impulse radio transmission system. The method involves defining one or more non-allowable regions within one or more pulse characteristic value range layouts, disallowing code element values that map to non-allowable regions while generating a code using a numerical code generation technique, and mapping code element values to pulse characteristic values in accordance with the defined layout(s).

II. Time Period Layouts

To facilitate mapping of codes to pulse characteristics, layouts of pulse characteristic values can be defined, where a pulse characteristic may be time position, pulse amplitude, pulse width (in time), pulse polarity, or pulse type. Such layouts can be defined in a multitude of ways to accommodate a wide variety of pulse transmission system applications. One layout approach involves a fixed value range layout where a range of pulse characteristic values over some range is divided into smaller and smaller components to achieve a desired component resolution in order to facilitate mapping of a code element value to a characteristic value that resides within a layout component, which corresponds to some range of values.

Figure 1:
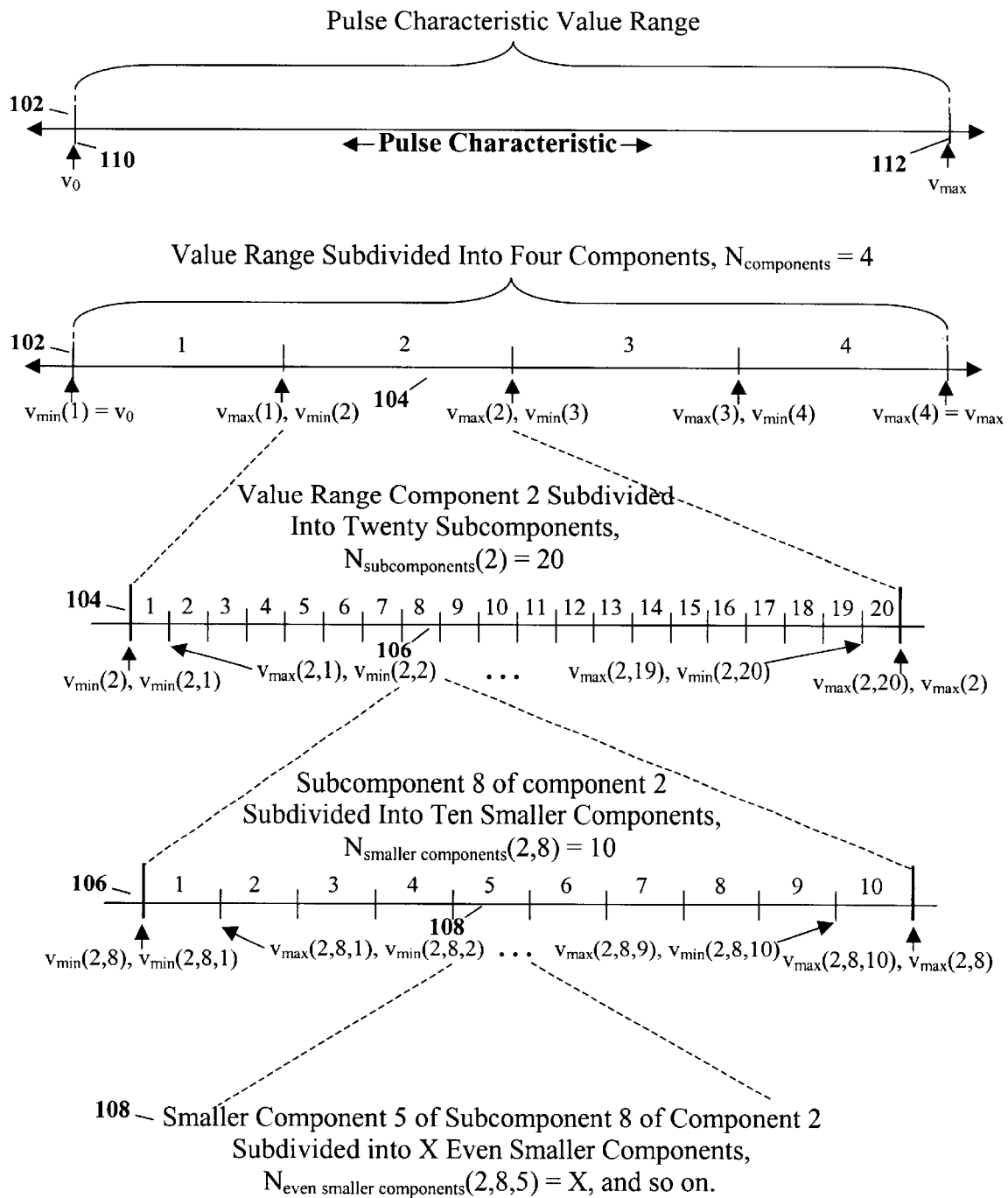
FIG. 1 illustrates a generic pulse characteristic value range layout including exemplary layout parameters, and exemplary subdivisions of the value range including components, subcomponents, smaller components, and even smaller components.

FIG. 1 illustrates an exemplary value range layout for a pulse characteristic. The layout 102 supports specification of characteristic values between a minimum value of $v_0$ at 110, and a maximum value of $V_{max}$ at 112. Layout 102 can be divided into components 104. Components 104 can be subdivided into subcomponents 106. Subcomponents 106 can be subdivided into smaller components 108, which can be subdivided into even smaller components. The process can be repeated, ad infinitum, so that smaller and smaller components can be defined.

The following describes this process in detail. Referring back to FIG. 1, the two layout parameters, $v_0$ and $v_{max}$, can be specified to define the value range, so that it is bounded by a minimum value of $v_0$ and a maximum value of $v_{max}$. A second layout parameter, $N_{components}$, can be specified to divide the value range layout 102 into one or more components 104 of the same size, or of different sizes, with each component 104 (indexed by the letter n) having a minimum value, $v_{min}(n)$, and a maximum value, $v_{max}(n)$, where n-1 to $N_{components}$.

The number and size of components used in a given layout 102 can be used for various reasons. For example, the number and size of the components 104 can be tailored to meet specific application requirements, to remain within system implementation limits, to achieve one or more of a variety of system characteristics in areas such as performance (i.e., bit rate), reliability (i.e., bit error rate), system-simplicity, ease-of-use, inter alia. When different sized components are employed, minimum and maximum values are specified for each component n, wherein the minimum value for a given component, $v_{min}(n)$, equals the maximum value of the preceding component, $v_{max}(n-1)$, or $v_0$, and the maximum value of a given component, $v_{max}(n)$, equals the minimum value for the following component, $v_{min}(n+1)$, or $v_{max}$. When same sized components are employed, the value range is evenly divided such that $V_{max}(n)-v_{min}(n)$ is equal for each component 104 indexed by n.

An array of layout parameters, $N_{subcomponents}$ ($N_{components}$), can be specified to subdivide each component 104 into subcomponents 106 of the same size, or of different sizes, with each subcomponent 106 (indexed by m) of the component 104 (indexed by n) having a minimum value, $v_{min}(n, m)$, and a maximum value, $v_{max}(n, m)$, where n-1 to $N_{components}$ and m=1 to $N_{subcomponents}(n)$.

As with components, the number and size of subcomponents 106 for a given component 104 used in a given layout 102 can also be tailored to meet specific application requirements, to remain within system implementation limits, to achieve one or more of a variety of system characteristics in areas such as performance (i.e., bit rate), reliability (i.e., bit error rate), system-simplicity, ease-of-use, etc., and/or for many other reasons. When different sized subcomponents are employed, minimum and maximum values are specified for each subcomponent m of each component n, wherein the minimum value for a given subcomponent, $v_{min}(n,m)$, equals the maximum value of the preceding subcomponent, $v_{max}(n,m-1)$, or the minimum value of the component in which the subcomponent resides, $v_{min}(n)$, and the maximum value of a given subcomponent, $v_{max}(n,m)$, equals the minimum value for the following subcomponent, $v_{min}(n, m+1)$, or the maximum value of the component in which the subcomponent resides, $v_{max}(n)$. When same sized subcomponents are employed, components are evenly divided such that $v_{max}(n,m)-v_{min}(n,m)$ is equal for each subcomponent m of a component n or for all components such that all subcomponents of a given component are of the same size, wherein subcomponent sizes may vary from component to component or all subcomponents of all components are of the same size depending on the sizes of the components and the numbers of subcomponents in the components.

In a manner consistent with the subdivision of components into subcomponents, additional multi-dimensional arrays of layout parameters can be used to further subdivide subcomponents 106 into smaller components 108 of the same or different sizes, ad infinitum, until a smallest desirable component resolution is attained, with components at each resolution level having a minimum value, $v_{min}(n, m, \ldots, a)$, and a maximum value, $v_{max}(n,m, \ldots, a)$, where n=1 to $N_{components}$, m=1 to $N_{subcomponents}(n), \ldots$, and a-1 to $N_{smallestcomponents}(n,m, \ldots)$. Such further subdivision of subcomponents into smaller and smaller components enables systems with finer and finer tuning resolution and thus higher and higher fidelity, increases modulation accuracy, and can be useful for other purposes.

As with components 104 and subcomponents 106, the number and size of these smaller components 108 can also be tailored to meet specific application requirements, to remain within system implementation limits, to achieve one or more of a variety of system characteristics in areas such as performance (i.e., bit rate), reliability (i.e., bit error rate), system-simplicity, ease-of-use, etc., and/or for many other reasons. When different sizes of these smaller components are employed, minimum and maximum values are specified for each component a, wherein the minimum value for a component, $v_{min}(n,m, \ldots, a)$, equals the maximum value of the preceding component, $v_{max}(n,m, \ldots, a-1)$, or the minimum value of the next higher level component in which the component resides, $v_{min}(n,m, \ldots)$, and the maximum value of a given component, $v_{max}(n,m, \ldots, a)$, equals the minimum value for the following component, $v_{min}(n, m, \ldots, a+1)$, or the maximum value of the next higher level component in which the component resides, $v_{max}(n, m, \ldots)$. When same sized smaller components are employed, the next higher level components are evenly divided such that $v_{max}(n, m, \ldots, a) - v_{min}(n,m, \ldots, a)$ is equal for each component a of a given next higher level component or for all next higher level components such that all components of a given next higher level component are of the same size, wherein component sizes may vary from next higher level component to next higher level component or all components of all higher level components are of the same size depending on the sizes of the next higher level components and the numbers of components in the next higher level components.

At the top of FIG. 1, a pulse characteristic value range 102 is depicted that is bounded by endpoints of $v_0$ (110) and $v_{max}$ (112). Beneath this illustration an equivalent value range is shown that has been subdivided into four components by setting the layout parameter $N_{components}$ to a value of four (4), and the size of each component has been established by setting the minimum and maximum values of each component, $v_{min}(n)$ and $v_{max}(n)$, where n=1 to 4. An enlargement of the second component is then shown where the component has been subdivided into twenty subcomponents by setting the layout parameter $N_{subcomponents}(2)$ to a value of twenty (20), and the size of each subcomponent has been established by setting the minimum and maximum values of the subcomponents within component two, $v_{min}(n,m)$ and $v_{max}(n,m)$, where n=2 and m-1 to 20. As illustrated, there are 20 subcomponents 106 in component 104, indexed by n=2, and m=1–20, labeled $v_{min}(2,1)$ through $v_{max}(2,20)$.

An enlargement of the eighth subcomponent of component two is then shown where the subcomponent has been subdivided into ten smaller components by setting the layout parameter $N_{smaller\_components}(2,8)$ to a value of ten (10), and the size of each smaller component has been established by setting the minimum and maximum values of the smaller components within subcomponent eight of component two, $v_{min}(n,m,l)$ and $v_{max}(n,m,l)$, where n=2, m=8, and l-1 to 10. As illustrated, there are 10 smaller components 108 in subcomponent 8 (106) of component 2 (104), indexed by n=2, and m=8, and l=1–10, labeled $v_{min}(2,8,1)$ through $v_{max}(2,8,10)$.

It is then shown that these smaller components could be subdivided into x even smaller components (whose size is not shown) using another layout parameter [e.g., $N_{even\_smaller\_components}(2,8,5)=x$], which can be further subdivided ad infinitum. Not shown in the figure are the enlargements of the other components, subcomponents, and smaller components, which for this example would also contain twenty subcomponents, ten smaller components, and x even smaller components, respectively.

By subdividing a value range layout into levels of smaller and smaller components and by varying or not varying the size of components at different levels, a multitude of different fixed value range layout permutations can be defined.

Another layout approach involves a layout representing non-fixed characteristic values. Such a layout may also be referred to as a delta value range layout. Such a layout is similar to a fixed value range layout except values are typically represented as delta values from some minimum delta to some maximum delta. Such a layout may be relative to the characteristic value of some other pulse (e.g., a preceding pulse value), which would have a delta of zero.

III. Non-allowable Regions

The present invention permits the establishment of allowable and non-allowable regions within a layout. One or more non-allowable regions are regions within in a characteristic value range layout within which a characteristic value of a pulse is not allowed. A non-allowable region may fully or partially include (or overlay) one or more components, subcomponents or smaller components. A non-allowable region can be based solely on a particular pulse characteristic value within a component, subcomponent, or smaller component or can be based relative to a characteristic value of one or more other pulses. For example, a non-allowable region can be defined such that a pulse characteristic value cannot be less than a component minimum value or greater than a component maximum value. Non-allowable regions may also be bounded by minimum and maximum values within a value range layout without regard to component minimum and maximum boundary values (e.g., a region that resides entirely within the boundaries of a component, subcomponent, etc.).

Non-allowable regions can be defined relative to other pulse characteristic values. For example, a minimum value difference between pulse characteristic values can be established by defining a non-allowable region about the characteristic value of another pulse such as the preceding pulse, succeeding pulse, or any other pulse. Similarly, a maximum value difference between pulse characteristic values can be established by defining a non-allowable region consisting of all values greater than or less than some difference from the characteristic value of another pulse. Non-allowable regions can also be defined that are bounded by a minimum and maximum difference in value between the characteristic value of the pulse and the characteristic value of another pulse.

FIG. 2 depicts non-allowable regions within a fixed temporal pulse characteristic value range layout. In the top portion of the figure, a component, subcomponent, or smaller component is shown, which is bounded by a minimum time value 202 and a maximum time value 204. A pulse 222 is shown at a position within the component (or subcomponent or smaller component). A preceding pulse 206 and succeeding pulse 208 are shown at positions within the preceding and succeeding time period components, respectively.

Non-allowable regions 210–220 are shown in layers to illustrate that they can overlap one another. Two non-allowable regions 210 are denoted A. These regions are used to maintain the correlation properties of a code, where one region consists of all time prior to the minimum time value of the component to which a code element value is mapped and the other region consists of all time after the maximum time value of the same component.

Three non-allowable regions 212, denoted as B, are defined. These regions are non-allowable regions that are bounded by minimum and maximum time values.

Two regions 214, denoted as C, illustrate the application of a minimum proximity limit. Here, the leftmost C region 214 represents a region where a pulse cannot be placed because it would violate the minimum proximity limit relative to the preceding pulse. On the other hand, the rightmost C region 214 represents a region where a pulse cannot be placed because it would violate the minimum proximity limit relative to the succeeding pulse.

Similarly, two regions 216, denoted as D, illustrate the application of a maximum proximity limit. Here, the leftmost D region 216 represents a region where a pulse cannot be placed because it would violate the maximum proximity limit relative to the succeeding pulse. On the other hand, the rightmost D region 216 represents a region where a pulse cannot be placed because it would violate the maximum proximity limit relative to the preceding pulse.

One non-allowable region 218, denoted as E, is defined. This region is a non-allowable region defined as being bounded by a minimum and maximum distance (in time) from the preceding pulse.

Two other non-allowable regions 220, are defined. These regions are non-allowable regions defined as being bounded by a minimum and maximum distance (in time) from the succeeding pulse.

The bottom portion of the figure depicts the combined effect of the non-allowable regions where the separated layers in the upper portion of the figure are overlaid to show that a given position within a time period component is either allowable or non-allowable.

FIG. 3 depicts non-allowable regions within a non-temporal pulse characteristic value range layout. Such a layout might apply to pulse amplitude, pulse width, or to any other pulse characteristic value having some magnitude. In the top portion of the figure, a component, subcomponent, or smaller component is shown, which is bounded by a minimum characteristic value 302 and a maximum characteristic value 304. The characteristic values of two pulses labeled Pulse 1 (306) and Pulse 2 (308) are shown.

As in FIG. 2, non-allowable regions are shown in layers to illustrate that they can overlap one another. Two non-allowable regions 310 are denoted as A. These are regions that are used to facilitate mapping a code element value, where one region consists of all values less than the minimum characteristic value of the component to which a code element value is mapped and the other region consists of all values greater than the maximum characteristic value of the same component.

Three non-allowable regions 312, denoted B, are shown. These regions are defined as being bounded by minimum and maximum characteristic values.

Four regions 314, denoted as C, are shown. These regions illustrate the application of a minimum value delta with Pulse 1 (306) and Pulse 2 (308) characteristic values. The first two regions represent where a value cannot be used because it would violate the minimum value delta (difference) relative to the Pulse 1 characteristic value. The other two regions represent where a value cannot be used because it would violate the minimum value delta relative to the Pulse 2 characteristic value.

Similarly, two regions 316, are denoted as D. These regions illustrate the application of a maximum delta rule. Here, the leftmost region represents where a value cannot be used because it would violate the maximum value delta relative to the Pulse 2 (308) characteristic value. On the other hand, the rightmost region represents where a value cannot be used because it would violate the maximum value delta relative to the Pulse 1 (306) characteristic value. (Two other regions of the same type as those shown in D are not shown due to the size of the figure.)

Four non-allowable regions 318, are denoted as E. These regions are bounded by minimum and maximum value deltas from the two pulses 306, 308.

The bottom portion of the figure depicts the combined effect of the non-allowable regions where the separated layers in the upper portion of the figure are overlaid to show that a given value within a component is either allowable or non-allowable.

FIGS. 4a through 4d depict non-allowable regions within non-fixed temporal characteristic value range layouts.

In FIG. 4a, non-allowable regions relative to a preceding pulse time position are shown. Specifically, a layout relative to a preceding pulse 402 at time position, $t_{k-1}$, is shown, where $t_a$, $t_b$, $t_c$, and $t_d$ are time values relative to the preceding pulse. Because time has an inherent order (i.e., by definition the time position value of the pulse in question succeeds the time position value of the preceding pulse), only those values after the preceding pulse are included in the non-fixed layout.

Four delta values, $\Delta t_a$, $\Delta t_b$, $\Delta t_c$, and $\Delta t_d$, illustrate how the time values can be translated into delta values in which case the time values $t_{k-1}$, $t_a$, $t_b$, $t_c$, and $t_d$ become 0, $\Delta t_a$, $\Delta t_b$, $\Delta t_c$, and $\Delta t_d$.

Three non-allowable regions 406–410, shown shaded with diagonal lines, are defined. The first region 406 enforces a minimum proximity limit, $\Delta t_{min}$, where $\Delta t_k$ cannot reside between 0 and $\Delta t_a$ and therefore $t_k$ cannot reside between $t_{k-1}$ and $t_a$. The second region 408 is bounded by minimum and maximum delta values, such that $\Delta t_k$ cannot reside between $\Delta t_b$ and $\Delta t_c$ and therefore $t_k$ cannot reside between $t_b$ and $t_c$. The third region enforces a maximum proximity limit, $\Delta t_{max}$, where $\Delta t_k$ cannot be greater than or equal to $\Delta t_d$ and therefore $t_k$ cannot be greater than or equal to $t_d$.

In FIG. 4b, non-allowable regions relative to any preceding pulse position are shown. Specifically, FIG. 4b illustrates that the non-allowable regions can be defined the same way relative to any preceding pulse, so that the only difference between FIGS. 4a and 4b is that $t_{k-1}$ becomes $t_{k-n}$.

FIGS. 4c and 4d illustrate that similar non-allowable regions can be defined relative to the succeeding pulse 412 position, $t_{k+1}$, and to any succeeding pulse 412 position, $t_{k+n}$, respectively. In the two figures, the first region 418 enforces a minimum proximity limit, $\Delta t_{min}$, where $\Delta t_k$ cannot reside between $-\Delta t_h$ and 0, and therefore $t_k$ cannot reside between $t_h$ and $t_{k+n}$. The second region 416 is bounded by minimum and maximum delta values, such that $\Delta t_k$ cannot reside between $-\Delta t_f$ and $-\Delta t_g$ and therefore $t_k$ cannot reside between $t_f$ and $t_g$. The third region 414 enforces a maximum proximity limit, $\Delta t_{max}$, where $\Delta t_k$ cannot be less than or equal to $-\Delta t_c$ and therefore $t_k$ cannot be less than or equal to $t_c$.

FIG. 5 illustrates non-allowable regions within a non-fixed non-temporal characteristic value layout relative to any other pulse having some characteristic value, $v_{k+n}$. This figure is consistent with (and similar to a combination of) FIGS. 4b and 4d. Here, six non-allowable regions 502–512 are shown with the three leftmost regions 502–506 mirroring the three rightmost regions 508–512.

The figure is two-sided as opposed to one-sided, due to a fundamental difference between temporal and non-temporal pulse characteristics. Whereas temporal characteristics have an inherent order to them (e.g., $t_{k+1}$ is always greater than $t_k$), non-temporal characteristics do not (i.e., $v_{k+1}$ can be less than, greater than, or the same as $v_k$).

Generally, non-allowable regions within a non-fixed temporal characteristic value range layout can be represented as a general non-allowable region set, $S_{na}$, where $S_{na}$ is equal to a union of some number, n, of defined non-allowable regions, $R_i$, relative to a zero reference delta value, where i–1 to n.

$$S_{na} = R_1 \cup R_2 \cup \ldots \cup R_n$$

Each non-allowable region, $R_i$, within the general non-allowable region set $S_{na}$ can be specified as a delta value range in which a delta value cannot reside.

$$R_i = \Delta t_k \notin [\Delta t\_low_i, \Delta t\_high_i]$$

This process allows a set of non-allowable regions, $S_{na}^{(n)}$, to be defined relative to any pulse position, $t_n$, by adding its time to the general non-allowable region set, $S_{na}$.

$$S_{na}^{(n)} = t_n + S_{na} = \{t_n + s : s \in S_{na}\}$$

Furthermore, the non-allowable regions to be enforced against a given pulse can be generally defined as:

$$t_k \notin \bigcup_{j \in I(k)} S_{na}^{(j)}$$

which states that the time position of pulse k cannot be an element of a union of non-allowable region sets about pulses j, where j ranges over all members of an index set I(k). This general equation allows the index set, I(k), to be any combination of pulses within the pulse train. Example index sets include but are not limited to:

| | |
|---|---|
| I(k) = {k−1} → | preceding pulse |
| I(k) = {k+1} → | succeeding pulse |
| I(k) = {0, 1, . . . , k−1} → | all preceding pulses |
| I(k) = {k+1, . . . , $k_{max}$} → | all succeeding pulses |

With the use of an index set, I(k), the enforcement of non-allowable regions can be considered conditional in that non-allowable regions are only applied to those pulses residing in the index set.

In one embodiment, another form of conditional enforcement could be based on a maximum number of pulse characteristic values that are allowed to reside in a non-allowable region (i.e., after some number of code element values indicate pulse characteristic values which reside in some non-allowable region or regions, no additional code element values are allowed to map to the non-allowable region or regions). This form of conditional enforcement could also be done using an allowable/non-allowable threshold based on a percentage of the pulses.

Relative non-allowable regions in a fixed or non-fixed value range layout can be based on statistical values calculated for some subset of pulse characteristic values such as a minimum, maximum, average, mode, or other such quantity. For example, a non-allowable region could be specified relative to an average characteristic value of all preceding pulses.

IV. Numerical Code Generation

After the characteristic layout and non-allowable regions have been defined, a code is generated using a numerical code generation technique where code element values within non-allowable regions are disallowed or discarded or not used. For the numerical code generation techniques described below, any generated code element value deemed to map to a non-allowable region is not used. Because certain numerical code generation techniques described below include dependencies of a code element on a previously generated code element, a non-used code element may be used to generate one or more other code elements, particularly the next code element in a sequence of code elements.

One numerical generation technique involves generation of a code comprised of pseudorandom numbers. A pseudorandom code can be generated using a computer's random number generator, binary shift-register(s) mapped to binary words, a chaotic code generation scheme, or another well-known technique. For pseudorandom code generation methods, any code element deemed to map to a non-allowable region can be discarded and another pseudorandom code element generated and evaluated for use.

Computer random number generator functions commonly employ the linear congruential generation (LCG) method, which generates the n-th random number, $x_n$, from the previous random number, $x_{n-1}$, using an equation of the general form:

$$x_n = Ax_{n-1} + c \pmod{m}$$

where n identifies a given code in the generated code sequence, and the generated sequence is characterized by the multiplier A, the additive constant c, the modulus m, and an initial seed $x_0$. These random number generator functions can be referred to as LCG(a,c,m,$x_0$), which determines the sequence generated.

Another method used for computer random number generator functions is the Additive Lagged-Fibonacci Generator (ALFG) method. This approach can be described by an equation of the form:

$$x_n = x_{n-j} + x_{n-k} \pmod{2^m}, j < k$$

where n identifies a given code in the generated code sequence, and j and k represent offsets to previously generated codes. The period of these generators is $(2^k-1)2^{m-1}$ and they are referred to as ALFG(l,k,m,$x_0$), which determines the sequence generated.

Binary shift-register pseudorandom number generators can be implemented in many different ways. One common approach is the linear feedback shift register illustrated in FIG. 6. FIG. 6 illustrates an exemplary linear feedback shift register, including exclusive OR gate 602 and registers 604. The linear feedback shift register can be described by an equation of the form:

$$x_{n+k} = \sum_{i=0}^{k-1} a_i x_{n+i} (\text{mod } 2)$$

where n identifies a given code in the generated code sequence, k is the number of bits in the shift register, $a_i$ is the value of the i-th bit in the shift register. The sequence of bits that is generated depends on the initial shift-register 604 state and which shift-register bit value, $a_i$, is fed back into the exclusive-OR device 602 along with the shifted output.

The ALFG method can also be implemented using a shift register 708 and a modulo adder 706 device, as shown in FIG. 7, which can be described by an equation of the form:

$$x_n = x_{n-j} + x_{n-k} (\text{mod } 2), j < k$$

where n identifies a given code in the generated code sequence, and j and k represent the shift-register 708 bits fed into the modulo adder device 706.

Many other different but related traditional approaches for generating pseudorandom code sequences can also be employed, comprising inversive congruential generators, explicit-inversive congruential generators, multiple recursive generators, and combined LCGs. Any of these or other similar traditional methods can be used to generate a pseudorandom code without departing from the scope of the invention.

In addition to the more traditional approaches described for generating pseudorandom codes, several other non-traditional approaches can be employed including chaotic code generators and Optimal Golomb Ruler (OGR) code generators. Any of these or other non-traditional methods can also be used to generate a pseudorandom code without departing from the scope of the invention.

Algebraic code generation methods can also be used in conjunction with or as applied to defined non-allowable regions. Such methods include quadratic congruential, linear congruential, hyperbolic congruential, Welch-Costas arrays, and Golomb-Costas arrays. When employing algebraic generation methods, entire codes containing code element values that map to non-allowable regions may be discarded or disallowed code element values within such codes may be adjusted to the closest value outside the non-allowable region(s) in which they reside. Discarding codes reduces the number of usable members in a code family. Adjusting non-allowable code element values to allowable values can affect correlation properties.

V. Mapping Code Elements to Pulse Characteristic Values

After a code has been generated using one of the above-noted numerical code generation techniques that produce only allowable code element values, code elements are mapped to pulse characteristic values.

According to the present invention, one or more non-allowable regions can be defined within fixed and non-fixed temporal and non-temporal pulse characteristic value range layouts, in a manner described above. For example, as explained above, a non-allowable region may be defined to prevent generation of unsuitable code elements that specify pulse positions that violate a minimum pulse proximity limit required for system implementation purposes. Codes are then generated by the present invention using code generation techniques that do not permit code element values to map to pulse characteristic values residing in defined non-allowable regions. In one exemplary embodiment, a temporal pulse characteristic may be a pulse position in time. A non-temporal pulse characteristic may for example be a pulse amplitude, width, polarity, and type.

According to the methods of the present invention, a characteristic value layout can be subdivided into components, which can be subdivided into subcomponents, which can be further subdivided, and so on. Components, subcomponents, and smaller components can be of the same size or of different sizes. Defined non-allowable regions may fully or partially include (or overlay) one or more components, subcomponents, or smaller components.

As previously described, a non-allowable region can be defined in many different ways. A non-allowable region may be defined based on a minimum value or maximum value or a component, subcomponent, or smaller component within a characteristic value range layout. Alternatively, a non-allowable region may be defined based on minimum and maximum values within a characteristic value range layout without regard to component minimum and maximum values.

Non-allowable regions may also be defined based on characteristic values of one or more pulses, such as one or more preceding pulses, one or more succeeding pulses, or any other combination of other pulses. Such relative non-allowable regions may establish a minimum difference or maximum value difference from one or more pulse characteristic values or may define non-allowable characteristic values within a minimum and maximum value difference from one or more pulse characteristic values. Alternatively, similar non-allowable regions may be defined based on a minimum, maximum, average, or any other statistical quantity value calculated from the characteristic values of two or more pulses.

According to other methods described for the present invention, non-allowable regions may be conditionally enforced when generating a code. Some of the embodiments include enforcement after some number of other code element values map to a non-allowable region or some percentage of code elements map to a non-allowable region.

VI. Exemplary Transceiver Implementation

Transmitter

Figure 8:
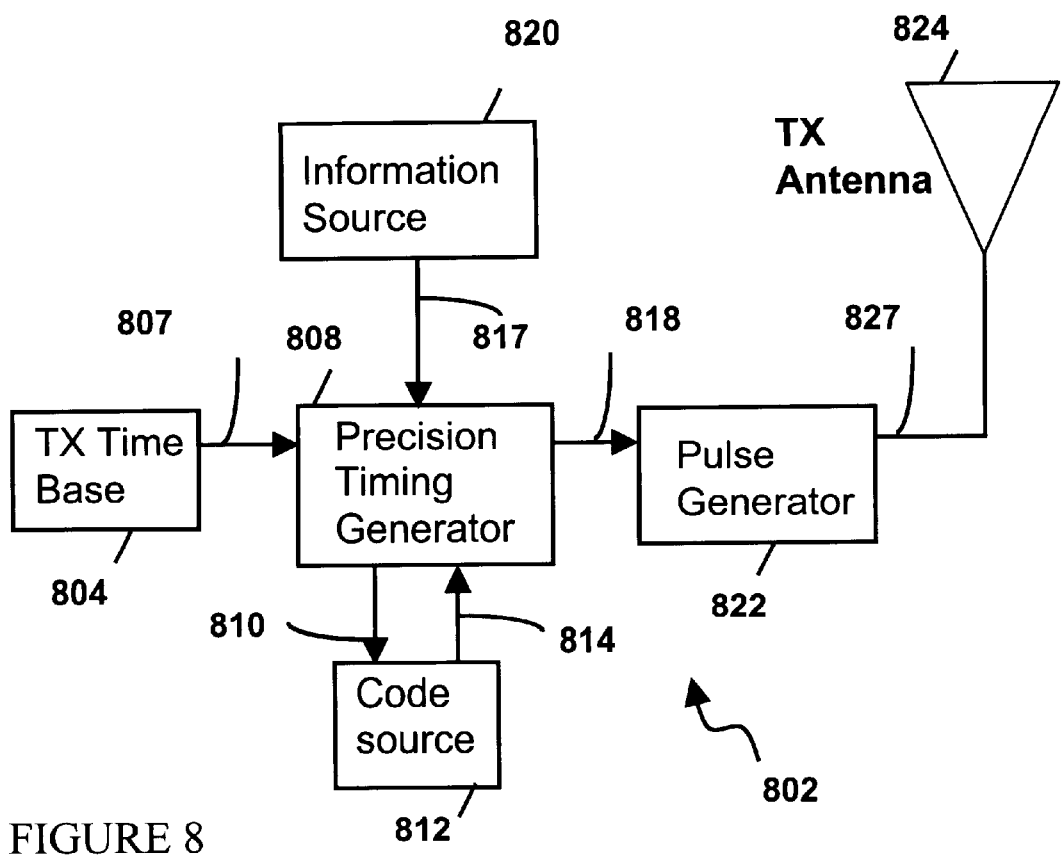
FIG. 8 illustrates an exemplary impulse radio transmitter for use in accordance with the present invention.

Referring to FIG. 8, an exemplary embodiment of an impulse radio transmitter 802 of an impulse radio communication system having one subcarrier channel that advantageously employs the above-described invention is shown.

The transmitter 802 comprises a time base 804 that generates a periodic timing signal 807. The time base 804 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 807 is supplied to a precision timing generator 808.

The precision timing generator 808 supplies synchronizing signals 810 to the code source 812 and utilizes the code source output 814 together with an internally generated subcarrier signal (which is optional) and an information signal 817 to generate a modulated, coded timing signal 818.

The code source 812 comprises a storage device such as a random access memory (RAM), read only memory (ROM), or the like, for storing suitable codes and for outputting the codes as a code signal 814. Alternatively, maximum length shift registers or other computational means can be used to generate the codes.

An information source 820 supplies the information signal 817 to the precision timing generator 808. The information signal 817 can be any type of intelligence, including digital bits representing voice, data, imagery, or the like, analog signals, or complex signals.

Figure 9:
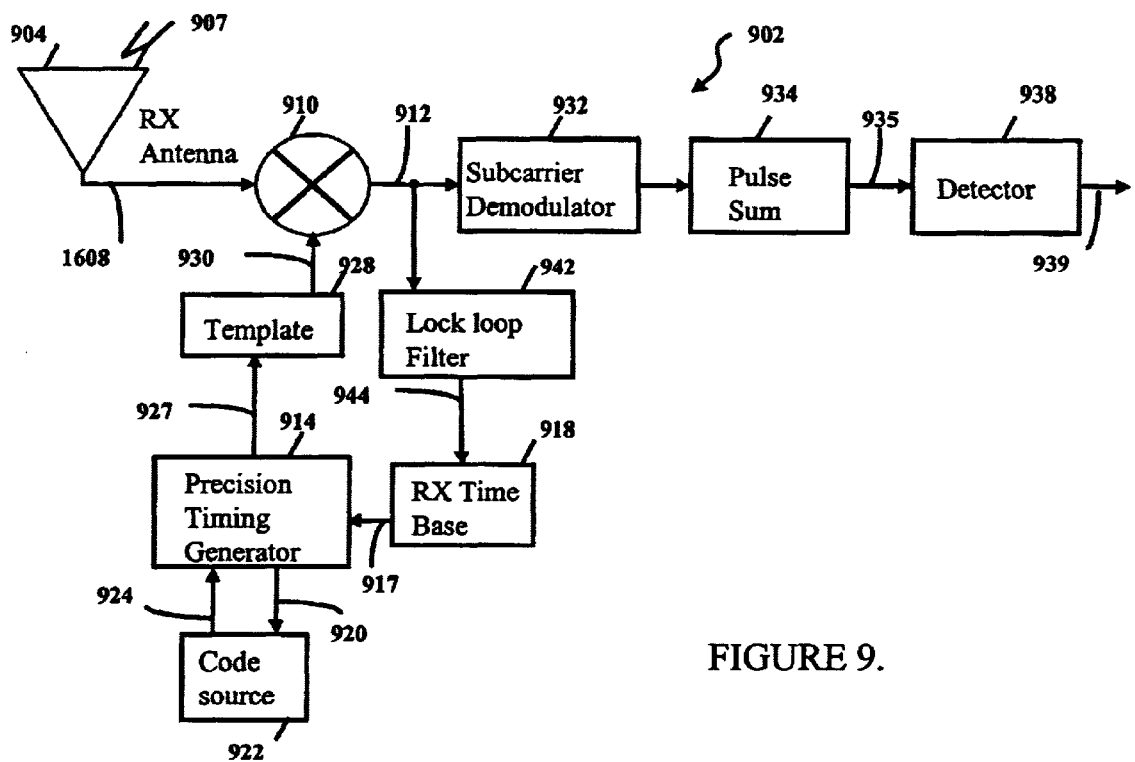
FIG. 9 illustrates an exemplary impulse radio receiver for use in accordance with the present invention.

A pulse generator 822 uses the modulated, coded timing signal 818 as a trigger to generate output pulses. The output pulses are sent to a transmit antenna 824 via a transmission line 827 coupled thereto. The output pulses are converted into propagating electromagnetic pulses by the transmit antenna 824. In the present embodiment, the electromagnetic pulses are called the emitted signal, and propagate to an impulse radio receiver 902, such as shown in FIG. 9, through a propagation medium, such as air, in a radio frequency embodiment. In a preferred embodiment, the emitted signal is wide-band ultrawide-band, approaching a monocycle pulse.

However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

FIG. 9 shows an exemplary embodiment of an impulse radio receiver 902 (hereinafter called the receiver) for the impulse radio communication that may be used in connection with the present invention. More specifically, the system illustrated in FIG. 9 is for reception of digital data wherein one or more pulses are transmitted for each data bit The receiver 902 comprises a receive antenna 904 for receiving a propagated impulse radio signal 907. A received signal 908 from the receive antenna 904 is coupled to a cross correlator or sampler 910 to produce a baseband output 912. The cross correlator or sampler 910 includes multiply and integrate functions together with any necessary filters to optimize signal to noise ratio.

The receiver 902 also includes a precision timing generator 914, which receives a periodic timing signal 917 from a receiver time base 918. This time base 918 is adjustable and controllable in time, frequency, or phase, as required by the lock loop in order to lock on the received signal 908. The precision timing generator 914 provides synchronizing signals 920 to the code source 922 and receives a code control signal 924 from the code source 922. The precision timing generator 914 utilizes the periodic timing signal 917 and code control signal 924 to produce a coded timing signal 927. The template generator 928 is triggered by this coded timing signal 927 and produces a train of template signal pulses 930 ideally having waveforms substantially equivalent to each pulse of the received signal 908. The code for receiving a given signal is the same code utilized by the originating transmitter 802 to generate the propagated signal 907. Thus, the timing of the template pulse train 930 matches the timing of the received signal pulse train 908, allowing the received signal 908 to be synchronously sampled in the correlator 910. The correlator 910 ideally comprises a multiplier followed by a short-term integrator to sum the multiplier product over the pulse interval.

Further examples and details of correlation and sampling processes can be found in commonly owned patents U.S. Pat. Nos. 4,641,317, 4,743,906, 4,813,057, and 4979,186, which are incorporated herein by reference, and commonly owned and co-pending application Ser. No. 09/356,384, filed Jul. 1999, titled: "Baseband Signal Converter Device for a Wideband Impulse Radio Receiver," which is incorporated herein by reference.

The output of the correlator 910, also called a baseband signal 912, is coupled to a subcarrier demodulator 932, which demodulates the subcarrier information signal from the subcarrier. The purpose of die optional subcarrier process, when used, is to move tie information signal away from DC (zero frequency) to improve immunity to low frequency noise and offsets. The output of the subcarrier demodulator 932 is then filtered or integrated in a pulse summation stage 934. The pulse summation stage produces an output representative of the sum of a number of pulse signals comprising a single data bit. The output of the pulse summation stage 934 is then compared with a nominal zero (or reference) signal output in a detector stage 938 to determine an output signal 939 representing an estimate of the original information signal 817.

The baseband signal 912 is also input to a lowpass filter 942 (also referred to as lock loop filter 942). A control loop comprising the lowpass filter 942, time base 918, precision timing generator 914, template generator 928, and correlator 910 is used to generate a filtered error signal 944. The filtered error signal 944 provides adjustments to the adjustable time base 918 to time position die periodic timing signal 927 in relation to the position of the received signal 908.

In a transceiver embodiment, substantial economy can be achieved by sharing part or all of several of die functions of the transmitter 802 and receiver 902. Some of these include the time base 918, precision timing generator 914, code source 922, antenna 904, and the like.

VII. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for generating codes indicating characteristics of pulses within a pulse train used by an impulse transmission system, comprising:

defining a non-allowable region within a pulse characteristic value range layout; and generating a code which does not permit code element values to map to pulse characteristic values residing in said non-allowable region.

2. The method of claim 1, wherein the characteristic of a pulse corresponds to a pulse position in time.

3. The method of claim 1, wherein the characteristic of a pulse corresponds to a pulse width characteristic.

4. The method of claim 1, wherein the characteristic of a pulse corresponds to a pulse amplitude characteristic.

5. The method of claim 1, wherein said characteristic value layout is subdivided into two or more components of the same size or of different sizes.

6. The method of claim 5, wherein a component is subdivided into two or more subcomponents of the same size or of different sizes.

7. The method of claim 6, wherein a subcomponent is further subdivided into two or more smaller components of the same size or of different sizes, and wherein said smaller components can be further subdivided.

8. The method of claim 1, wherein said non-allowable region fully or partially include any one of:

one or more components;

one or more subcomponents; and one or more smaller components.

9. The method of claim 1, wherein said non-allowable region is defined based on any one of:
   minimum values; and
   maximum values, of any one of:
      a component;
      a subcomponent; and
      any smaller component, within said characteristic value range layout.

10. The method of claim 1, wherein said non-allowable region is defined based on minimum and maximum values within said characteristic value range layout.

11. The method of claim 1, wherein said non-allowable region is defined based on said characteristic values of at least one pulse.

12. The method of claim 11, wherein the at least one pulse is a preceding pulse.

13. The method of claim 11, wherein the at least one pulse is a succeeding pulse.

14. The method of claim 10, wherein said non-allowable region establishes any one of:
   a minimum value difference; and
   a maximum value difference.

15. The method of claim 1, wherein said non-allowable region is defined based on any one of:
   a minimum value;
   a maximum value;
   an average value;
   a variance; and
   any other statistical quantity value, said value being calculated from the characteristic values of at least two pulses.

16. The method of claim 10, wherein said non-allowable region is bounded by a minimum and maximum value difference.

17. The method of claim 1, wherein said pulse characteristic value range layout specifies any one of:
   fixed characteristic values; and
   non-fixed characteristic values.

18. The method of claim 1, wherein a pulse is conditionally prohibited from being placed in a non-allowable region.

19. The method of claim 18, wherein a pulse is prohibited from being placed in a non-allowable region based on a subset of said code elements within said code.

20. The method of claim 18, wherein a pulse is prohibited from being placed in a non-allowable region after some subset of said code element values map to characteristic values within said non-allowable region.

21. An impulse transmission system comprising:
   a Time Modulated Ultra Wideband Transmitter;
   a Time Modulated Ultra Wideband Receiver; and
   said Time Modulated Ultra Wideband Transmitter and said Time Modulated Ultra Wideband Receiver employ a code indicating allowable characteristics of pulses within a pulse train, wherein a non-allowable region within a pulse characteristic value range layout is defined, and code element values of said code are not permitted to map to pulse characteristic values residing in said non-allowable region.

22. The impulse transmission system of claim 21, wherein the characteristic of a pulse corresponds to a pulse position in time.

23. The impulse transmission system of claim 21, wherein the characteristic of a pulse corresponds to a pulse width characteristic.

24. The impulse transmission system of claim 21, wherein the characteristic of a pulse corresponds to a pulse amplitude characteristic.

25. The impulse transmission system of claim 21, wherein said characteristic value layout is subdivided into two or more components of the same size or of different sizes.

26. The impulse transmission system of claim 25, wherein a component is subdivided into two or more subcomponents of the same size or of different sizes.

27. The impulse transmission system of claim 26, wherein a subcomponent is further subdivided into two or more smaller components of the same size or of different sizes, and wherein said smaller components can be further subdivided.

28. The impulse transmission system of claim 21, wherein said non-allowable region fully or partially include any one of:
   one or more components;
   one or more subcomponents; and
   one or more smaller components.

29. The impulse transmission system of claim 21, wherein said non-allowable region is defined based on any one of:
   minimum values; and
   maximum values, of any one of:
      a component;
      a subcomponent; and
      any smaller component, within said characteristic value range layout.

30. The impulse transmission system of claim 21, wherein said non-allowable region is defined based on minimum and maximum values within said characteristic value range layout.

31. The impulse transmission system of claim 21, wherein said non-allowable region is defined based on said characteristic values of at least one pulse.

32. The impulse transmission system of claim 31, wherein said pulse is a preceding pulse.

33. The impulse transmission system of claim 31, wherein said pulse is a succeeding pulse.

34. The impulse transmission system of claim 30, wherein said non-allowable region establishes any one of:
   a minimum value difference; and
   a maximum value difference.

35. The impulse transmission system of claim 21, wherein said non-allowable region is defined based on any one of:
   a minimum value;
   a maximum value;
   an average value;
   a variance; and
   any other statistical quantity value, said value being calculated from the characteristic values of at least two pulses.

36. The impulse transmission system of claim 30, wherein said non-allowable region is bounded by a minimum and maximum value difference.

37. The impulse transmission system of claim 21, wherein said pulse characteristic value range layout specifies any one of:
   fixed characteristic values; and
   non-fixed characteristic values.

38. The impulse transmission system of claim 21, wherein a pulse is conditionally prohibited from being placed in a non-allowable region.

39. The impulse transmission system of claim 38, wherein a pulse is prohibited from being placed in a non-allowable region based on a subset of said code elements within said code.

40. The impulse transmission system of claim 38, wherein a pulse is prohibited from being placed in a non-allowable region after a subset of said code element values map to characteristic values within said non-allowable region.

* * * * *